No. 796,680. PATENTED AUG. 8, 1905.
E. SOLLER & F. HOTTINGER.
EXPLOSION ENGINE.
APPLICATION FILED APR. 29, 1904.

2 SHEETS—SHEET 1.

Witnesses
George G. Schoenlank
Thomas Kirkpatrick

Inventors
Eugen Soller
Friedrich Hottinger
by H. Van Oldenmeel
Attorney

No. 796,680. PATENTED AUG. 8, 1905.
E. SOLLER & F. HOTTINGER.
EXPLOSION ENGINE.
APPLICATION FILED APR. 29, 1904.

2 SHEETS—SHEET 2.

UNITED STATES PATENT OFFICE.

EUGEN SOLLER AND FRIEDRICH HOTTINGER, OF BASEL, SWITZERLAND; SAID HOTTINGER ASSIGNOR TO SAID SOLLER.

EXPLOSION-ENGINE.

No. 796,680.        Specification of Letters Patent.        Patented Aug. 8, 1905.

Application filed April 29, 1904. Serial No. 205,581.

*To all whom it may concern:*

Be it known that we, EUGEN SOLLER and FRIEDRICH HOTTINGER, citizens of the Republic of Switzerland, residing in Basel, in the Canton of Basel, Republic of Switzerland, (whose post-office addresses are Klarastrasse 43, Basel,) have invented certain new and useful Improvements in Explosion-Engines; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

We have applied for patents in the following countries: Switzerland, on May 1, 1903, and Austria on March 29, 1904.

This invention relates to that class of explosion-engines in which two pistons are arranged within the same cylinder and in which the crank-shaft is mounted beneath the cylinder and is connected with the pistons through the agency of beams and connecting-rods.

According to the present improvement, for the purpose of reducing the length of the motor as much as possible and also in order to avoid the necessity for cut-away spaces in the ends of the cylinder the arms of the beams transmitting the motion of the piston-rods to the connecting-rods and the crank are provided with bearings for the piston-rods projecting toward the center of the cylinder. Moreover, the cylinder is removably arranged on a frame open above and beneath, the open parts being provided with removable covers.

Figure 1:
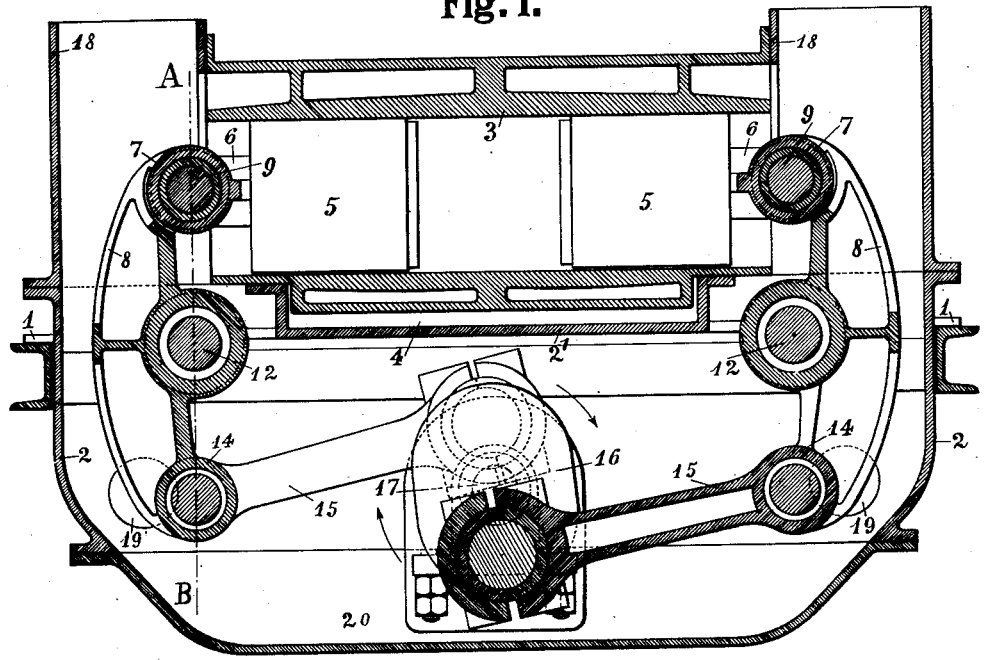
Figure 2:
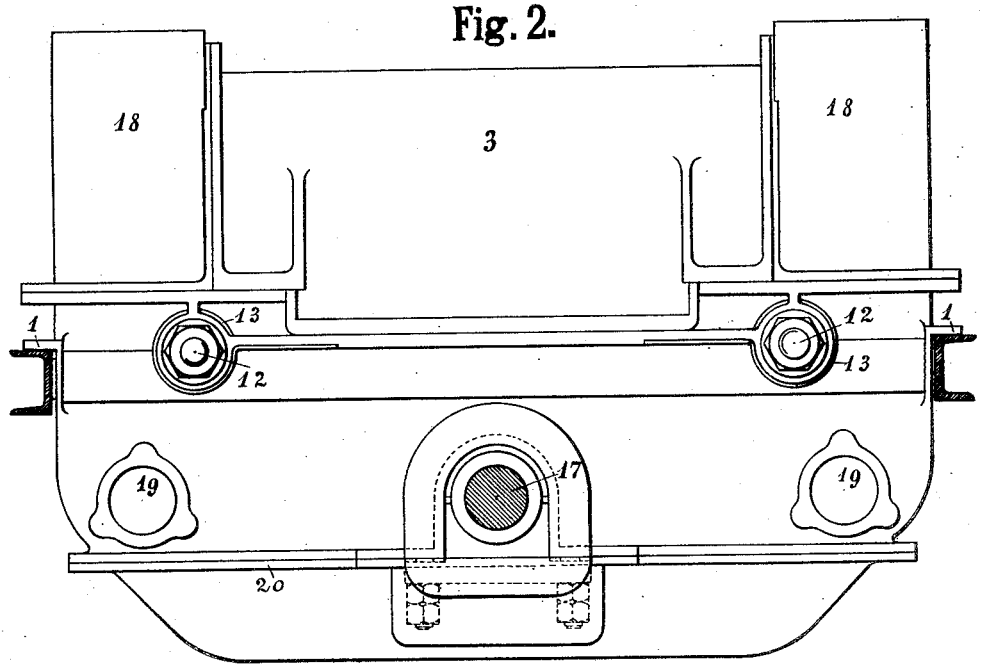
Figure 3:
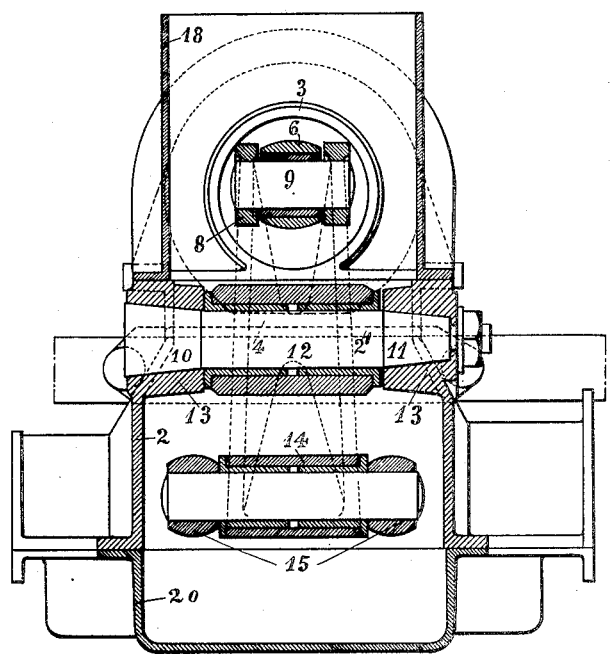

In the accompanying drawings, which illustrate the improved engine as adapted, for instance, to drive an automobile and in which only the essential parts are shown, Figure 1 is a longitudinal vertical section through the axis of the cylinder of the engine. Fig. 2 is a side elevation, and Fig. 3 is a transverse section, on the line A B of Fig. 1.

As shown in said drawings, the frame 2, provided with supporting-lugs 1, carries the working cylinder 3, there being provided between the middle portion of the cylinder and a cross-support 2' of the frame an interspace 4, extending the length of the explosion-chamber, which interspace permits the passage of air round about the cylinder, and thus enables the cylinder to be cooled by air-currents, as well as diminishing the direct transmission of heat from the cylinder to the parts beneath. In the cylinder move two pistons 5, each connected by means of a piston-rod 6 with a bolt 9, mounted in a bearing 7 of a beam 8. Each of the beams 8 is pivotally mounted at its center by means of a pivot 12, provided with conical bearing-surfaces 10 and 11 in the lugs 13 of the frame 2. The lower ends 14 of the beams 8 are connected by means of the connecting-rods 15 with the crank 16, and so with the shaft 17. The bearings 7 project forward opposite the center of the cylinder from the remaining part of the beam, so that in the oscillation of the beams the bearings 7 may project right into the cylinder without it being necessary to leave cut-away portions in the ends of the cylinder. With a given piston-stroke this arrangement permits the length of the engine to be reduced to the minimum.

The ends of the cylinder 3 are covered by easily-removable covers 18, resting on the frame 2, which covers are open on top for admitting cooling-air. By removal of both covers at the extreme positions of the pistons ready access to the bearings 7 and 13 is provided when it is desired to examine the inner parts or to remove the pistons from the cylinder. In the frame 2 are provided openings 19, which are normally closed, which openings enable the pivots of the lower ends 14 of the beams to be removed when the engine is mounted. The frame 2 is closed at the bottom by means of a cover 20, so that the mechanism is protected against admission of dust and the like. This engine is especially adapted for use in connection with automobiles and ships, though its employment is likewise applicable in stationary plants. The frame 2 might also be provided with boxes for receiving the conical bearing-faces of the pivot 12.

Having now particularly described and ascertained the nature of our said invention and in what manner the same is to be performed, we declare that what we claim is—

1. In an explosive-engine, the combination of a cylinder having its ends open, two pistons movable therein, a crank-shaft arranged below the cylinder, rods connecting said crank-shaft with the pistons, a casing carrying the cylinder, said casing having a space between itself and the cylinder, the said casing consisting of a bottom portion inclosing the crank-shaft and connecting-rods and two removable end portions inclosing the open ends of the cylinder, said end portions having their tops uncovered.

2. In an explosive-engine, the combination of a cylinder having its ends open, a casing having removable end portions covering the open ends of the cylinder and a bottom portion closing the casing underneath.

In testimony that we claim the foregoing we have hereunto set our hands this 11th day of April, 1904.

EUGEN SOLLER.
FRIEDRICH HOTTINGER.

Witnesses:
GEORGE GIFFORD,
ALBERT GROETZ.